(12) United States Patent
Hamberger et al.

(10) Patent No.: US 12,392,868 B2
(45) Date of Patent: Aug. 19, 2025

(54) RADAR TEST SYSTEM

(71) Applicant: Rohde & Schwarz GmbH & Co. KG, Munich (DE)

(72) Inventors: Gerhard Hamberger, Griesstaett (DE); Matthias Beer, Neubiberg (DE); Steffen Neidhardt, Dorfen (DE); Maximilian Bogner, Munich (DE); Benedikt Simper, Munich (DE); Marius Brinkmann, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 337 days.

(21) Appl. No.: 18/147,653

(22) Filed: Dec. 28, 2022

(65) Prior Publication Data

US 2023/0305107 A1    Sep. 28, 2023

(30) Foreign Application Priority Data

Mar. 25, 2022    (EP) ..................................... 22164297

(51) Int. Cl.
*G01S 7/40*    (2006.01)
*G01S 13/931*    (2020.01)

(52) U.S. Cl.
CPC ............... *G01S 7/40* (2013.01); *G01S 13/931* (2013.01)

(58) Field of Classification Search
None
See application file for complete search history.

(56) References Cited

U.S. PATENT DOCUMENTS

| | | | | | |
|---|---|---|---|---|---|
| 4,884,078 | A | * | 11/1989 | Fishkin | G01R 29/10 342/174 |
| 5,038,146 | A | * | 8/1991 | Troychak | H01Q 3/267 342/372 |
| 6,157,343 | A | * | 12/2000 | Andersson | H01Q 3/267 342/174 |
| 6,252,542 | B1 | * | 6/2001 | Sikina | H01Q 3/267 342/174 |

(Continued)

FOREIGN PATENT DOCUMENTS

| | | |
|---|---|---|
| EP | 1 002 240 B1 | 3/2003 |
| EP | 1 034 442 B1 | 2/2009 |
| WO | 99/027383 A1 | 6/1999 |

OTHER PUBLICATIONS

Extended European Search Report issued in EP 22164297.8-1206 by the European Patent Office on Sep. 7, 2022.

*Primary Examiner* — Bernarr E Gregory
(74) *Attorney, Agent, or Firm* — Studebaker Brackett PLLC (57) ABSTRACT

The present application relates to a radar test system for testing a device-under-test (DUT) including an antenna array, wherein the antenna array includes: at least two RX antennas having a different antenna polarization and at least one TX antenna, or at least two TX antennas having a different antenna polarization and at least one RX antenna. The radar test system further includes a selection module configured to select one RX antenna and one TX antenna of the antenna array and to connect the selected RX antenna with the selected TX antenna, wherein the selected RX antenna is configured to receive a radar signal from the DUT, and wherein the selected TX antenna is configured to transmit a response signal to the DUT.

16 Claims, 8 Drawing Sheets

(56) References Cited

U.S. PATENT DOCUMENTS

| | | |
|---|---|---|
| 2019/0187247 A1 | 6/2019 | Izadian et al. |
| 2021/0055382 A1 | 2/2021 | Kong |
| 2021/0405153 A1 | 12/2021 | Lee |
| 2022/0077938 A1 | 3/2022 | Laabs et al. |

* cited by examiner

| TX | RX | Azimuth | Elevation | Coupling |
|---|---|---|---|---|
| 1 | 1 | ✓ | — | med. |
| 2 | 1 | — | ✓ | med. |
| 3 | 1 | — | ✓ | low |
| 4 | 1 | — | med. | non-preferred |
| 1 | 2 | — | ✓ | low |
| 2 | 2 | ✓ | — | low |
| 3 | 2 | med. | med. | high |
| 4 | 2 | — | ✓ | med. |
| 1 | 3 | — | ✓ | med. |
| 2 | 3 | med. | med. | high |
| 3 | 3 | ✓ | — | low |
| 4 | 3 | — | ✓ | low |
| 1 | 4 | — | med. | non-preferred |
| 2 | 4 | — | ✓ | low |
| 3 | 4 | — | ✓ | med. |
| 4 | 4 | ✓ | — | med. |

RADAR TEST SYSTEM

TECHNICAL FIELD OF THE INVENTION

The invention relates to a radar test system for testing a radar of a device-under-test (DUT), such as a vehicle.

BACKGROUND OF THE INVENTION

Radar test systems for testing radar units are known. For example, automotive radar test systems can be used for testing a radar unit of a vehicle, such as a car.

Such radar test systems can comprise an antenna array for receiving, respectively transmitting, radar signals. However, such systems are often limited to the polarizations of their antennas. For instance, a radar-under-test may not be tested properly if the radiation emitted by the radar-under-test and the antennas of the test system are linearly cross-polarized to each other.

The document US 2021/0405153 A1 discloses a system for testing a vehicular radar. This system includes a free-space polarization adapter (FSPA) configured to alter a first polarization state of electromagnetic waves from a radar device under test (DUT) to a second polarization state. However, requiring an additional FSPA enhances the complexity and reduces the flexibility of the system.

Furthermore, unwanted effects, such as cross-talk can occur between different antennas of a test system and can negatively affect the test performance during certain measurements.

Thus, it is an objective to provide an improved radar test system and an improved method for testing a DUT which avoid the above disadvantages. In particular, it is an objective to reduce the polarization limitations of a radar test system.

SUMMARY OF THE INVENTION

The object of the present invention is achieved by the solution provided in the enclosed independent claims. Advantageous implementations of the present invention are further defined in the dependent claims.

According to a first aspect, the invention relates to a radar test system for testing a device-under-test, DUT, with an antenna array comprising: at least two RX antennas having a different antenna polarization and at least one TX antenna, or at least two TX antennas having a different antenna polarization and at least one RX antenna. The radar test system further comprises a selection module configured to select one RX antenna and one TX antenna of the antenna array and to connect the selected RX antenna with the selected TX antenna; wherein the selected RX antenna is configured to receive a radar signal from the DUT; and wherein the selected TX antenna is configured to transmit a response signal to the DUT.

This achieves the advantage that antennas with different polarizations can be used for receiving and/or transmitting radar signals from, respectively to, the DUT. In this way, a limitation of the test system to certain polarizations can be avoided. For instance, DUTs which emit radar signals at different polarizations can be tested with such a system by simply selecting suitable RX/TX antenna pairs. In addition, a strong or a weak coupling between the selected RX and TX antennas can be achieved, depending on a desired test mode of the system.

The DUT can be a device that is equipped with a radar unit. The radar unit of the DUT can emit the radar signal, e.g. in the form of a radar pulse. The radar signal can have a certain, preferably linear, polarization (e.g., horizontal or vertical or slanted). For example, the DUT is a vehicle and the radar test system is an automotive radar test system.

In particular, the radar signal is a radio frequency (RF) signal, preferably millimeter wave radiation.

An RX antenna can be an antenna configured to receive signal (reception antenna) and a TX antenna can be an antenna configured to transmit signals (transmission antenna). The selected RX and TX antenna can be electrically connected (e.g., via electrical cables).

The antenna array may comprise a plurality of RX antennas and a plurality of TX antennas. Each of the RX and TX antennas can have one out of a number of possible antenna polarizations (e.g., one out of six different polarizations, namely: vertical, horizontal, +45°, −45°, left-handed circular and right-handed circular). Preferably, the possible antenna polarizations of the RX and TX antennas are linear polarizations. Preferably only two different polarizations are used: horizontal and vertical or +45° and −45° or left-handed circular and right-handed circular.

At least two of the RX antennas can each have a different antenna polarization, and at least two of the TX antennas can each have a different antenna polarization. The antenna array may further comprise at least one pair of RX and TX antennas with identical antenna polarizations and at least one pair of RX and TX antennas with different antenna polarizations.

Here, antenna polarization may refer to an oscillation direction of an antenna's electrical field, i.e. the plane in which an electrical field that is emitted by an antenna or preferably received by an antenna oscillates. The polarization is, for instance, in the same plane as the elements of the antenna.

The antennas of the antenna array can be arranged in a grid of at least two vertically displaced rows and at least two horizontally displaced columns of antennas.

Preferably, the antenna array is configured to forward the radar signal from the DUT that is received at the selected RX antenna to the selection module. The selected TX antenna is configured to transmit the response signal, which is forwarded by the selection module, to the DUT.

The response signal is a radar signal that is based on the received radar signal from the DUT. For example, the response signal is a delayed and optionally amplified or attenuated version of the radar signal.

In an embodiment, the antenna array comprises the same number of RX and TX antennas. Preferably, the number of TX antennas and the number of RX antennas differ by less than 15%, 10% or by less than 5% from each other.

This achieves the advantage that a larger number of selectable RX and TX antennas with different polarizations can be provided.

In an embodiment, the antenna array comprises at least 2, 4, 8, 16, 24, 32, 48, 64, or 96 RX antennas, and/or at least 2, 4, 8, 16, 24, 32, 48, 64, or 96 TX antennas.

This achieves the advantage that a larger number of selectable RX and TX antennas with different polarizations can be provided.

In an embodiment, the selected RX antenna and the selected TX antenna are adjacent antennas of the antenna array.

This achieves the advantage that the distance between the selected RX and the selected TX antenna can be minimized. Thus, the selected antennas appear as single target points to the radar-under-test. The distance between the selected RX and TX antenna is, for example, smaller than 5 cm, 4 cm, 3 cm, 2 cm, 1 cm, 7 mm or smaller than 5 mm. Preferably, the distance between the selected RX and TX antenna is around 3 mm. Between two antennas being considered adjacent to each other, preferably no other antenna is arranged.

The selected RX antenna and the selected TX antenna can have the same or a different antenna polarization, depending on which test is carried out by the test system.

In an embodiment, the antennas of the antenna array are arranged in a grid comprising at least two vertically displaced rows; wherein, in a first operating mode of the selection module, the selected RX antenna and the selected TX antenna have a different antenna polarization and are arranged in the same row of the antenna array. In that case the selected RX antenna and the selected TX antenna are only displaced horizontally to each other. For example, in the first operating mode, the selected RX antenna and the selected TX antenna are displaced more horizontally than vertically. Preferably, the selected RX antenna and the selected TX antenna are displaced more than 3 times, 5 times or more than times more horizontally than vertically.

This achieves the advantage that an elevation error, caused by a different height of the selected RX and TX antennas, is minimized. Furthermore, the cross-talk between selected RX and TX antennas can be minimized due to their different polarizations.

In an embodiment, the antennas of the antenna array are arranged in a grid comprising at least two vertically displaced rows; wherein, in a second operating mode of the selection module, the selected RX antenna and the selected TX antenna have a different antenna polarization and are arranged in different rows but in the same column of the antenna array. In that case the selected RX antenna and the selected TX antenna are only displaced vertically to each other. For example, in the second operating mode, the selected RX antenna and the selected TX antenna are displaced more vertically than horizontally. Preferably, the selected RX antenna and the selected TX antenna are displaced more than 3 times, 5 times or more than 10 times more vertically than horizontally.

This achieves the advantage that an azimuth error, caused by a horizontal displacement of the selected RX and TX antennas, is minimized. Furthermore, the cross-talk between the selected RX and TX antennas can be minimized due to their different polarizations.

In an embodiment, the antennas of the antenna array are arranged in a grid comprising at least two vertically displaced rows and at least two horizontally displaced columns; wherein, in a third operating mode of the selection module, the selected RX antenna and the selected TX antenna have an identical antenna polarization and are arranged:

a) in the same row or in the same column of the antenna array; or
b) in different rows and different columns.

Regarding feature a), the respective elevation or azimuth error is minimal (for example zero) which is required for certain tests. Other tests also require that there is an azimuth and elevation error which is provided by feature b). This achieves the advantage that a stress test with high cross-talk between the selected RX and TX antennas can be performed. If aligned diagonally, the polarization vector for the selected RX and TX antennas could run through the same plane. A radar signal received by the RX antenna is delayed and transmitted by the TX antenna. Due to the high coupling, the transmitted radar signal is again received by the RX antenna. As such, a subsequent transmission is achieved (stress test) towards the DUT. This loop can be interrupted by deselecting the RX and/or TX antenna and/or by reducing the power to the amplifier for example. In general, it is always desired to select RX and TX antennas having a low azimuth and/or elevation separation. A good coupling is also achievable with the same polarization direction and small vertical or small horizontal spacing. The RX and TX antennas do not have to be aligned diagonally to each other.

In an embodiment, the selection module is configured to deselect the selected RX and the selected TX antenna after the transmission of the response signal, and to subsequently select and connect at least one additional pair of RX and TX antennas of the antenna array one after another.

This achieves the advantage that it allows toggling through different RX/TX antenna pairs of the antenna array to simulate different targets and/or perform different tests. In particular, the selection module can be in different modes depending on the selected RX/TX antenna pair. In that case a target can be simulated moving from left to right or from right to left of the DUT for example.

In an embodiment, the selection module comprises at least one RX switching device and at least one TX switching device; wherein some or all of the RX antennas are connected to a respective input port of the RX switching device, and wherein some or all of the TX antennas are connected to a respective output port of the TX switching device; wherein the selection module is configured to connect one of the input ports of the RX switching device to one of the output ports of the TX switching device.

This achieves the advantage that a RX and TX antenna pair can be selected and connected efficiently. Preferably any RX antenna can be connected to any TX antenna. However, RX and TX antenna are normally connected to each other which are in close proximity to each other. This is especially done if the radar of the DUT is MIMO based. For other radar types (SIMO (single-input-multiple-output) or MISO (multiple-input-single-output), it could be beneficial to utilize RX and TX antennas which are spaced (further or far) apart, since the coupling is reduced further.

In particular, the RX switching device further comprises a single output port that is connected to a single input port of the TX switching device. The RX switching device and the TX switching device can be formed by an RX chip and a TX chip, respectively. The RX chip and the TX chip can be arranged on different layers of a multiplayer substrate, e.g. of a PCB. Together, the RX switching device and the TX switching device essentially form a switch matrix.

In an embodiment, the selection module is configured to downconvert the received radar signal into an intermediate frequency, IF, signal, and to upconvert the IF signal to form the response signal, and to forward the response signal to the selected TX antenna for transmission to the DUT.

In particular, the selection module can further be configured to delay the downconverted IF signal prior to upconverting it to the response signal.

In an embodiment, the selection module comprises a local oscillator and a mixing unit which are configured to downconvert the received radar signal to the IF signal, and to upconvert the IF signal to the response signal.

In particular, via the (single) local oscillator and the mixing unit (comprising a first and a second mixer), the downconversion and the upconversion can be performed with the same frequency and preferably the same phase.

In an embodiment, the selection module further comprises a delay unit configured to delay the transmission of signals from the selected RX antenna to the selected TX antenna.

In particular, the delay unit is configured to delay the transmission of the downconverted IF signal. The delay unit can be arranged between the selected RX and TX antennas.

The delay unit may comprise a FPGA (field programmable gate array), an electrical cable and/or an optical cable. Via the FPGA different delays can be set. Further, electrical cables or optical cables of different lengths which are exchangeable (preferably) without soldering can be used to delay the signal.

In an embodiment, the selection module comprises at least one power detector which is arranged between the selected RX and TX antennas connected to each other; wherein the power detector is configured to detect a signal strength of a signal received by the selected RX antenna and to classify said signal based on the signal strength.

In an embodiment, the power detector is configured to classify a signal received at the selected RX antenna as a cross-talk signal if the signal strength is below a threshold value; wherein the selection module is configured to reduce an amplification and/or to increase an attenuation of a received signal that is classified as cross-talk signal.

In this way the signal strength of a cross-talk signal can be reduced. In particular, a cross-talk signal is a signal that was previously transmitted from a TX antenna (and not a signal directly received from the radar of the DUT by the RX antenna).

For example, in the first or second operating mode of the selection module, those cross-talk signals are unwanted and should be suppressed. However, in the third operating mode of the selection module, these cross-talk signals are wanted and should be maintained (amplified). In particular, in the third operating mode, pairs of antennas are selected which have a higher coupling (same polarization) and, as such, a cross-talk signal has a higher signal strength. Also in the third operating mode, RX and TX antennas can be selected with are arranged in the same row or in the same column thereby minimizing either the elevation error or the azimuth error.

The selection module may further comprise an attenuator and/or amplifier configured to amplify respectively attenuate a received signal.

According to a second aspect, the invention relates to a set comprising the radar test system according to the first aspect of the invention and a DUT, in particular a vehicle, wherein the DUT comprises at least one radar unit; wherein the radar test system is arranged in the direction of a radar pulse emitted by the radar unit.

For example, absorbers can be arranged around a space between the radar unit of the DUT and the radar test system thereby forming a space for the transmitted and the reflected radar pulses. The DUT can be a vehicle, such as a motorbike, car, truck, or a bus. The radar unit can be arranged in a front section of the vehicle, such that it emits radar pulses mainly in a forward direction. The radar unit of the DUT normally ignores immediate reflections e.g. which might occur at the housing of the radar test system, because those reflections occur too fast (time difference between sending the radar signal and receiving the reflected radar signal is below a predetermined threshold). As such, the radar unit of the DUT normally awaits the delayed response signal transmitted by respective the TX antenna.

According to a third aspect, the invention relates to a method for testing a device-under-test, DUT, using an antenna array, wherein the antenna array comprises at least two RX antennas having a different antenna polarization and at least one TX antenna, or at least two TX antennas having a different antenna polarization and at least one RX antenna; wherein the method comprises the steps of:

selecting one RX antenna and one TX antenna of the antenna array;

connecting the selected RX antenna with the selected TX antenna;

receiving a radar signal from the DUT with the selected RX antenna; and transmitting a response signal to the DUT with the selected TX antenna.

The above description with regard to the radar test system according to the first aspect of the invention is correspondingly valid for the method according to the third aspect of the invention.

BRIEF DESCRIPTION OF THE DRAWINGS

The invention will be explained in the following together with the figures.

DETAILED DESCRIPTION OF THE PREFERRED EMBODIMENTS

Figure 1:
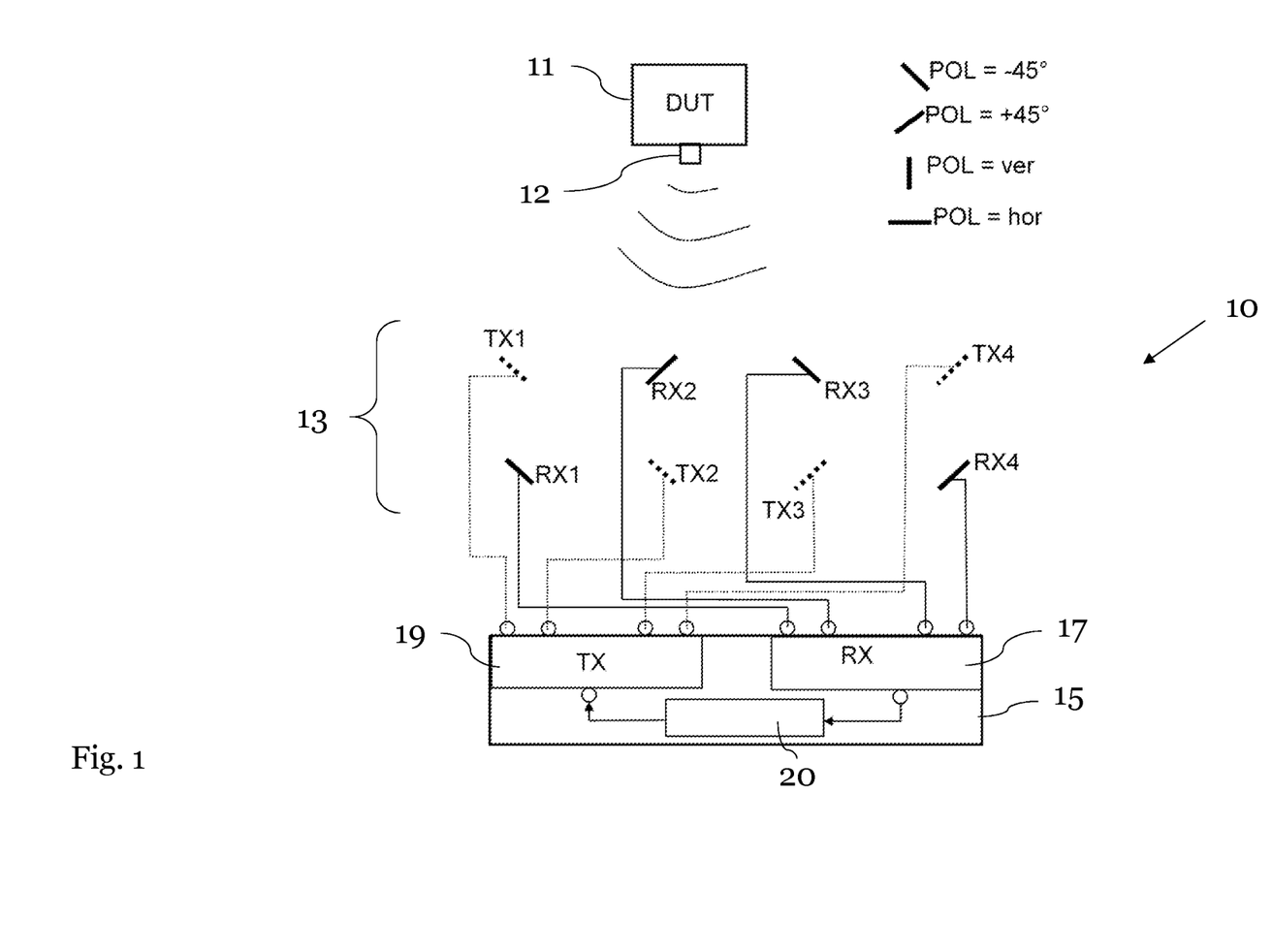
FIG. 1 shows a schematic diagram of a radar test system according to an embodiment.

FIG. 1 shows a radar test system 10 for testing a device-under-test (DUT) 11 according to an embodiment.

The radar test system 10 comprises an antenna array 13 and a selection module 15. The antenna array 13 comprises at least two RX antennas having a different antenna polarization and at least one TX antenna, or at least two TX antennas having a different antenna polarization and at least one RX antenna. The selection module 15 is configured to select one RX antenna and one TX antenna of the antenna array 13 and to connect the selected RX antenna with the selected TX antenna, wherein the selected RX antenna is configured to receive a radar signal from the DUT 11, and wherein the selected TX antenna is configured to transmit a response signal to the DUT 11.

The DUT 11 can be equipped with a radar unit 12 which emits the radar signal, e.g. in the form of a radar pulse.

The response signal that is transmitted by the TX antenna can be a radar signal that is based on the received radar signal. The TX antenna can be configured to transmit the response signal towards the DUT 11.

In the example shown in FIG. 1, the radar test system 10 comprises four RX antennas (RX1 to RX4) and four TX antennas (TX1 to TX4). In principle, the antenna array may comprise any number of RX and TX antennas, wherein at least two of the RX antennas have different antenna polarizations, and/or wherein at least two of the TX antennas have different antenna polarizations. In particular, at least one pair of TX and RX antennas of the array 13 may have a different antenna polarization while at least one other pair of TX and RX antennas may have the same antenna polarization.

For example, the antenna array 13 can comprises at least 2, 4, 8, 16, 24, 32, 48, 64, or 96 RX antennas, and/or at least 2, 4, 8, 16, 24, 32, 48, 64, or 96 TX antennas. In particular, the antenna array 13 comprises the same number of RX and TX antennas.

The radar test system 10 can be installed in close proximity to the radar 12 of the DUT 11. The RX antennas (RX1 . . . RX4) can be configured to receive radar signal from the DUT and the TX antennas (TX1 . . . TX4) can be configured to transmit a response signal based on the received radar signal back to the DUT 11. For example, the response signal is preferably a delayed and optionally amplified or attenuated version of the radar signal that is retransmitted to the DUT 11. However, a delay is not always necessary. Sometimes a fast reply indicating obstacles in a short distance (~1 m) could also be desired for some test cases.

The antennas RX1-4 could also be called receivers, wherein TX1-4 of the array 13 could also be called radiators. The antennas RX1-4, TX1-4 can be arranged in different rows extending along the width of the antenna array and spaced apart along the height of the antenna array.

In particular, the antennas arranged in one row are spaced apart (preferably only) horizontally. The distances between the respective antennas is preferably the same, but could also be different. There can be at least a second row with different antennas. Both rows are spaced apart vertically. For instance, the second row is arranged closer to the floor than the first row. Both, the first and the second row can comprise both types of antennas (RX and TX). It would also be possible that the first row only comprises RX antennas and the second row only TX antennas or vice versa.

In particular, the antennas RX1-4, TX1-4 are arranged in a grid with at least two vertically displaced rows and at least two horizontally displaced columns.

Each antenna preferably only operates in exactly one polarization. In particular, the antennas of the array 13 are linearly polarized. Possible polarizations of the antennas in the array 13 are, for instance: +45°, −45°, horizontal, vertical, left-handed circular and right-handed circular. Thereby, the polarizations +45° and −45° respectively vertical and horizontal are perpendicular to each other. As such, cross coupling can be minimized. The polarizations of each antenna RX1-4, TX1-4 in FIG. 1 is represented schematically by their inclination. The antennas RX1-4 and TX1-4 in FIG. 1 are angularly aligned and have polarizations of either −45° or +45°. Within FIG. 1 no antennas are shown which have a horizontal or vertical or left-handed circular or right-handed circular polarization.

The selection module 15 may comprise an RX switching device 17 and a TX switching device 19. The RX switching device 17 can be an RX chip and the TX switching device 19 can be a TX chip.

For example, the RX switching device 17 can comprise a number of input ports for connecting the RX antennas and a single output port. The TX switching device 19 may comprise a number of output ports for connecting the TX antennas and a single input port. The single output port of the RX switching device 17 can be connected to the single input port of the TX switching device 19. The selection module 15 can be configured to select an input port of the RX switching device 17 and an output port of the TX switching device 19 and to connect the selected ports via the connected single output and input port of the RX and TX switching device 17, 19, respectively.

Thus, the RX switching device 17 and the TX switching device 19 can be used to connect different pairs of RX and TX antennas to carry out different tests or test scenarios with the system 10.

The RX antennas can be reception antennas and the TX antennas can be transmission antennas. In principle, all antennas can be suitable for both reception and transmission. Thus, whether an antenna of the array 13 is an RX or a TX antenna may depend on it being connected to the RX switching device 17 or the TX switching device 19.

The selection module 15 may further comprise a delay unit 20. The delay unit 20 can be arranged between the RX switching device 17 and the TX switching device 19. The delay unit 20 can be configured to delay the transmission of signals from the RX switching device 17 to the TX switching device 19 and, hence, from the selected RX antenna to the selected TX antenna. In this way, a certain time delay between receiving the radar signal through the RX antenna and transmitting it to the TX antenna can be simulated.

The delay unit 20 can be made of an optical fiber which is, for instance, (at least) 3, 10, 15, 20, 25, 30, 35, 40, 45, 50, 55, 60, 65, 70, 75, 80, 85, 90, 95, or (at least) 100 m long. The delay unit 20 can be exchangeable for a shorter or longer fiber. For example, the fiber can be wound up in a cylinder to save space. The delay unit 20 can also be made of an electrical component, such as an FPGA (Field Programmable Gate Array). This would make the delay unit 20 more flexible. The delay unit 20 could further be an electrical line, for example a coaxial line. However, in that case, the attenuation is much higher compared to a fiber line. Optical fibers or electrical lines have the advantage to be inexpensive solutions for generating a signal delay.

Figure 2:
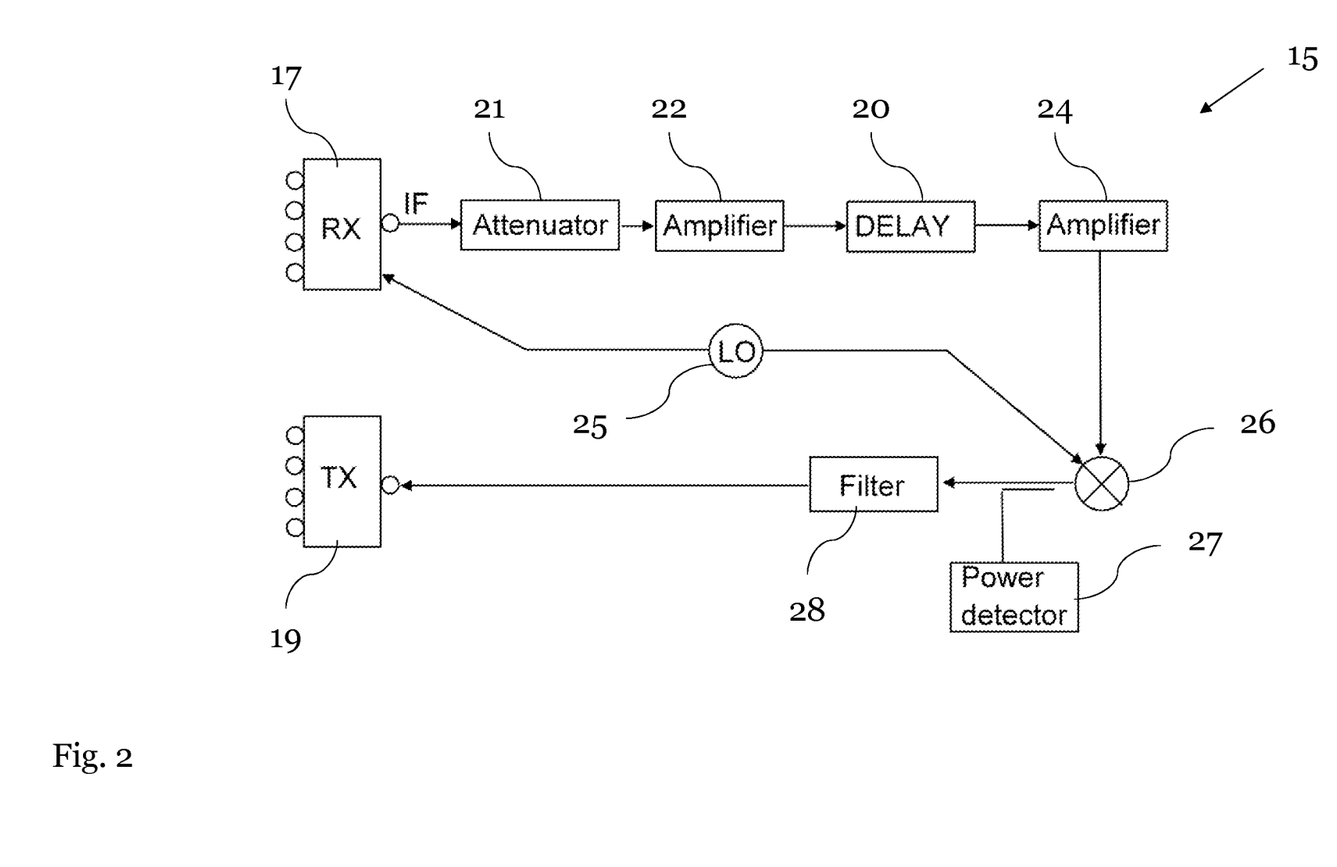
FIG. 2 shows a schematic diagram of a selection module according to an embodiment.

FIG. 2 shows a schematic diagram of a selection module 15 according to an embodiment.

In the example shown in FIG. 2, the RX switching device 17 comprises four input ports and one output port. The selection module 15, in particular the RX switching device 17, may comprise a mixer device to downconvert the radar signal into an IF (intermediate frequency). The radar signal preferably has a frequency of 76 GHz to 81 GHz and the IF signal can have a frequency of 400 MHz to 5.4 GHz. Deviations from those values are possible.

The TX switching device 19 may comprise a (power) amplifier that amplifies a signal applied at its one input port by a factor of 4, for example.

In particular, the RX switching device 17 only connects one input port out of, e.g., four input ports with its one output port at the same time. A control unit (not shown) can be configured to control the RX switching device 17 in such a way that the respective input port and, therefore the respective RX antenna element, is selected and connected to the output port. The RX switching device 17 can for example be compared to a switch board.

The TX switching device 19 may connect its one input port with a respective output port (e.g., one port out of four ports in FIG. 2) and therefore with the respective TX antenna at the same time. Preferably, the same control unit (not shown) can be configured to control the TX switching device 19 in such a way that the respective output port and therefore the respective TX antenna element is selected and connected to the input port. The TX switching device 19 can also be compared to for example a switch board.

The output port of the RX switching device 17 is preferably connected to an (low noise) amplifier 22. Between the RX switching device 17 and the (low noise) amplifier 22, an attenuator 21 (i.e. one or more discrete stages) can be added.

The low noise amplifier 22 can be connected to the delay unit 20. The delay unit 20 is, for instance, an optical fiber. The delay unit 20 may comprise a SFT-module (Small Form-factor Pluggable module) which can be used to convert an electrical signal into an optical signal. A SFT-module is a modular optical or electrical transceiver. As mentioned above, the delay unit 20 could also comprise an FPGA or a coaxial line.

The output of the delay unit 20 can be connected to an (linearity) amplifier 24. This can be especially the case if a coaxial line or an FPGA is used as delay unit 20.

The selection module 15 can also comprise a power detector 27. The power detector 27 can be, among other positions, arranged behind the (linearity) amplifier 24.

The power detector 27 could be used for a variety of functions. The power detector 27 could be used to detect whether a signal (pulse) is present or not. If a signal is detected, the amplifiers 22, 24 could be powered down for a certain period of time or the attenuator 21 could be ramped up for a certain period of time, to ensure that any cross coupling (if not in a stress mode) does not result in another signal being fed back through the RX antenna and transmitted again through the TX antenna.

Furthermore, if a signal is detected that is present but below the threshold value, it can be assumed that this signal is a result of cross-talking between the selected TX and RX antennas. In that case, the attenuator 21 can be ramped up and/or one or more amplifiers 22, 24 can be powered down/reduce the amplification so the signal strength is reduced/not increased. In that case, the power detector 27 could be arranged quite early in the stage. In particular, by comparing a detected signal to the threshold, the power detector can classify the signal based on the signal strength.

After the (linearity) amplifier 24, a mixer 26 can be used to upconvert the IF signal again. The mixer 26 is preferably driven by the same local oscillator 25 as the RX switching device 17. In particular, the same local oscillator 25 can be configured to downconvert the received radar signal to the IF signal and to upconvert the (manipulated, for example delayed) IF signal to the response signal. In that case, the (optional) power detector 27 is arranged after (in the signal transmission direction) the mixer 26. However, the (optional) power detector 27 could also be arranged before the mixer 26.

After the mixer 26, a filter 28 can be used to eliminate a ghost frequency. The (optional) power detector 27 could be arranged between the filter 28 and the mixer 26 or after the filter 28.

Then, the signal can be fed to the TX switching device 19, amplified there, and transmitted back to the DUT 11 as response signal.

FIGS. 3*a*-*d* show schematic diagrams of an antenna array 13 according to an embodiment.

In particular, FIGS. 3*a*-*d* show different operating modes of the selection module 15. In these operating modes, different TX and RX antenna pairs of the antenna array 13 in FIG. 1 are selected. This antenna array 13 comprises two vertically displaced rows of antennas (row 1 and row 2). The antennas are preferably all spaced apart from one another and do not have a common center. The antennas are further preferably not arranged in an overlapping manner.

In each operating mode of the selection module 15, a different type of measurements can be carried out. For each measurement, the radar 12 of the DUT 11 sends a signal to the antenna array which is reflected back once to the DUT 11.

Typically, the selected RX antenna and the selected TX antenna should to be decoupled as much as possible. Therefore, RX and TX antennas with opposite polarizations are typically selected, e.g. an RX antenna with a polarization of +45° and a TX antenna with a polarization of −45°. Alternatively, an RX antenna with a polarization of −45° and a TX antenna with a polarization of +45° could also be selected as well as an RX antenna with a horizontal polarization and a TX antenna with a vertical polarization. Of course, an RX antenna with a vertical polarization and a TX antenna with a horizontal polarization could also be selected.

However, for certain types of measurements, in particular stress test, the coupling between the TX antenna and the RX antenna should be very high so that a loop is established. This means that the response signal that is sent via the TX antenna couples directly into the RX antenna again. This coupling is preferably predominantly or only achieved wirelessly. In that case, signals are transmitted continuously by the respective TX antenna (i.e. periodically).

Figure 3A:
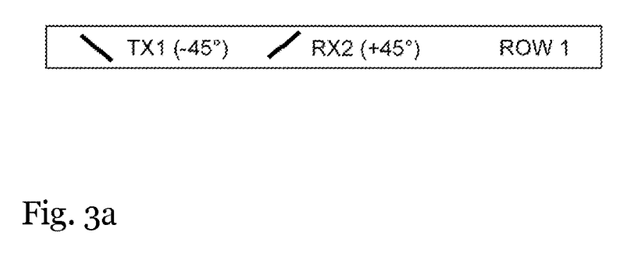
FIGS. 3a-d show schematic diagrams of an antenna array according to an embodiment.

FIG. 3*a* shows a first mode of the selection module 15 in which an RX antenna and a TX antenna from the same row, namely TX1 and RX2 from row 1, are selected. I.e., the selected antennas are only spaced apart horizontally. Furthermore, both antennas have a different antenna polarization (−45° for TX1 and +45° for RX2).

In this way, an elevation test can be carried out. Due to the selection of the antennas from the same row, an elevation error can be minimized.

Figure 3B:
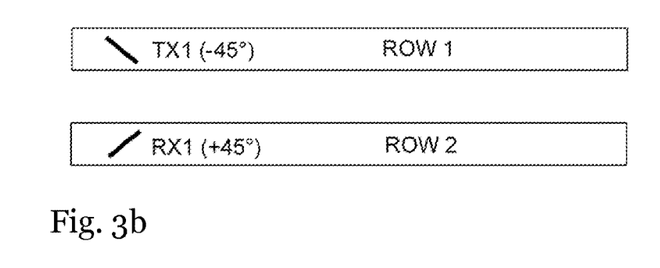

FIG. 3*b* shows a second mode of the selection module 15 in which an RX and a TX antenna from different rows, namely TX1 and RX1, are selected which are only spaced apart vertically. Again, both antennas have a different antenna polarization (−45° for TX1 and +45° for RX1).

In this way, an azimuth test can be carried out. Due to the selection of the antennas from the different rows with now horizontal displacement, an azimuth error can be minimized.

In FIGS. 3*a* and 3*b*, horizontally, respectively vertically, adjacent antennas of the array are selected as RX/TX pairs. In this way, only one reflection is generated by the radar test system. Furthermore, the cross coupling is weak due to the different polarization vectors of the RX and TX antenna, such that no signal loop is generated.

Figure 3C:
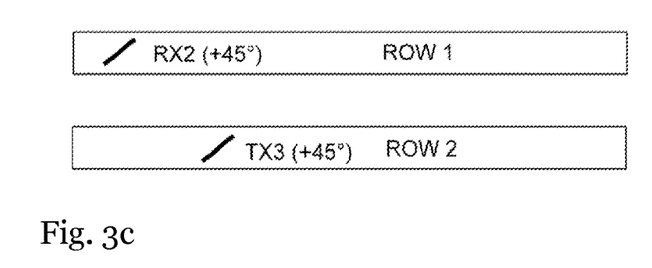
Figure 3D:
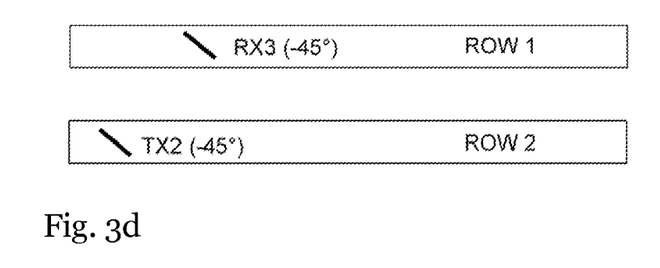

FIGS. 3*c*-*d* show a third mode of the selection module 15 in which an RX and a TX antennas are selected which have the same antenna polarization. The respective RX and TX antennas are preferably arranged closely (preferably next to each other) to each other (for example same row or same column). However, the antennas could also be spaced apart from each other diagonally (i.e., antennas in different rows which are also horizontally displaced). Both possibilities result in very high coupling. In the example shown in FIG. 3*c*, the antennas RX2 and TX3 each with a polarization of +45° are chosen, and the example shown in FIG. 3*d*, the antennas RX3 and TX2 each with a polarization of −45° are chosen.

These antennas can be selected if a stress test should be performed by the radar test system, i.e. if strong cross coupling should be achieved to generate a signal loop. For instance, in the third operating mode, multiple virtual targets for the radar unit can be generated by a single delay. The targets re-appear in range at n*r_Target, with n=1, 2, . . . , N and r_Target is the set target delay in the target simulator backend of the radar test system 10.

After performing a measurement in a certain mode, the selection module 15 can be configured to deselect the selected RX and TX antennas, and to subsequently select and connect one or more additional pairs of RX and TX antennas of the antenna array 13 one after another.

Figure 4:
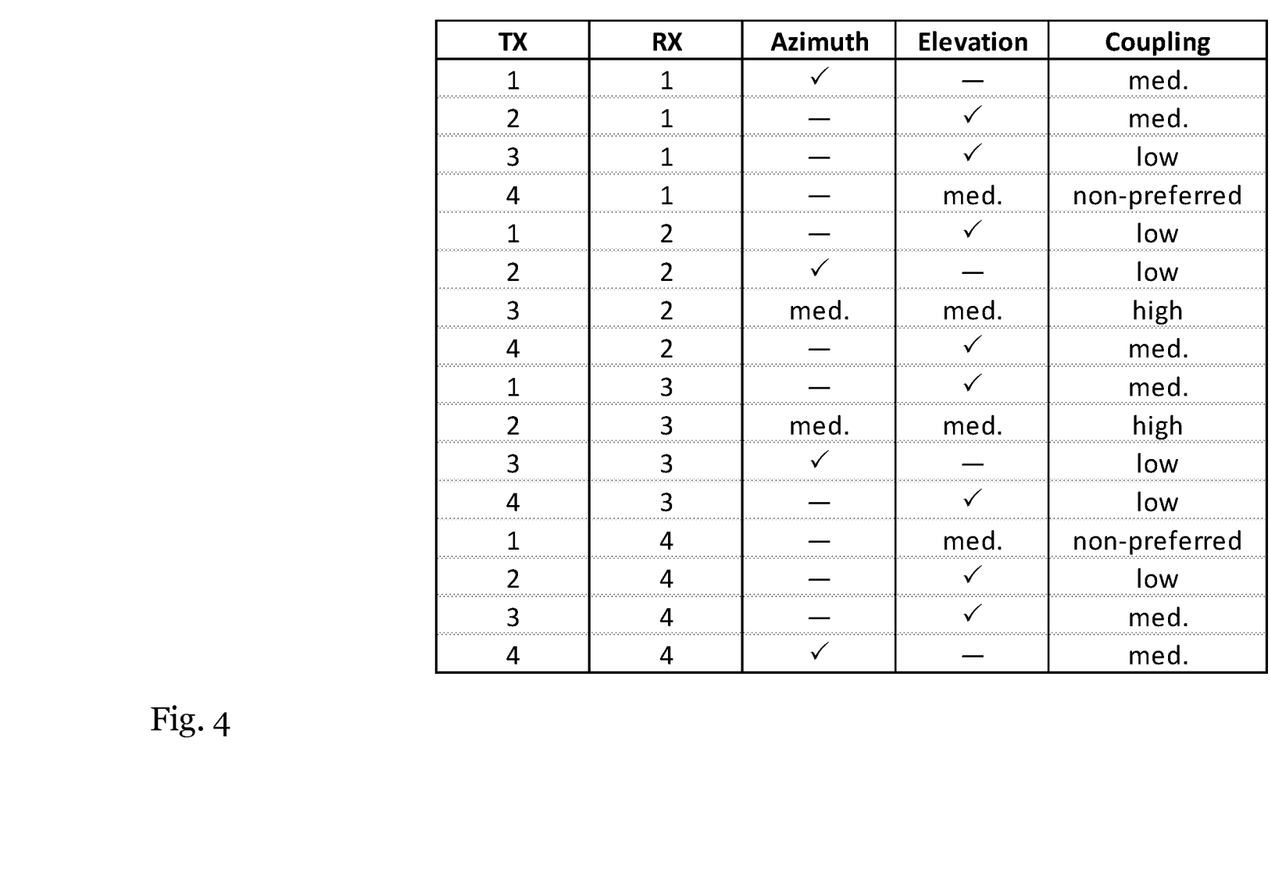
FIG. 4 shows a table with different antenna selections according to an embodiment.

FIG. 4 shows a table with different antenna selections (truth table) according to an embodiment. The table shows for each possible RX/TX pair of the antenna array 13 in FIG. 1, if the pair is suitable for an azimuth and elevation measurement and how strong a coupling between the selected antennas would be.

Thus, by selecting specific pairs of RX and TX antennas, different polarizations can be used for receiving and transmitting an RF signal to avoid cross coupling. The radar test system 10, for instance, makes use of this in the first and second operating mode, where the RX, TX switching devices 17, 19 can select suitable antennas having different polarizations but are arranged in the same row (elevation error minimized) or in the same column but different in different rows (azimuth error minimized).

Also, high coupling can be desirable, e.g., during a stress test (third operating mode). In this case, antennas are selected which have the same polarizations. These antennas could be arranged in the same row or same column. However, they could also be spaced apart diagonally from each other in different rows and different columns of the antenna array 13.

Thus, the antenna array 13 can provide both: TX and RX antenna combinations with high coupling and equal antenna polarization (high cross-talk), as well as TX and RX antenna combinations with low coupling and orthogonal antenna polarizations in order to maximize the cross-talk suppression.

Figure 5:
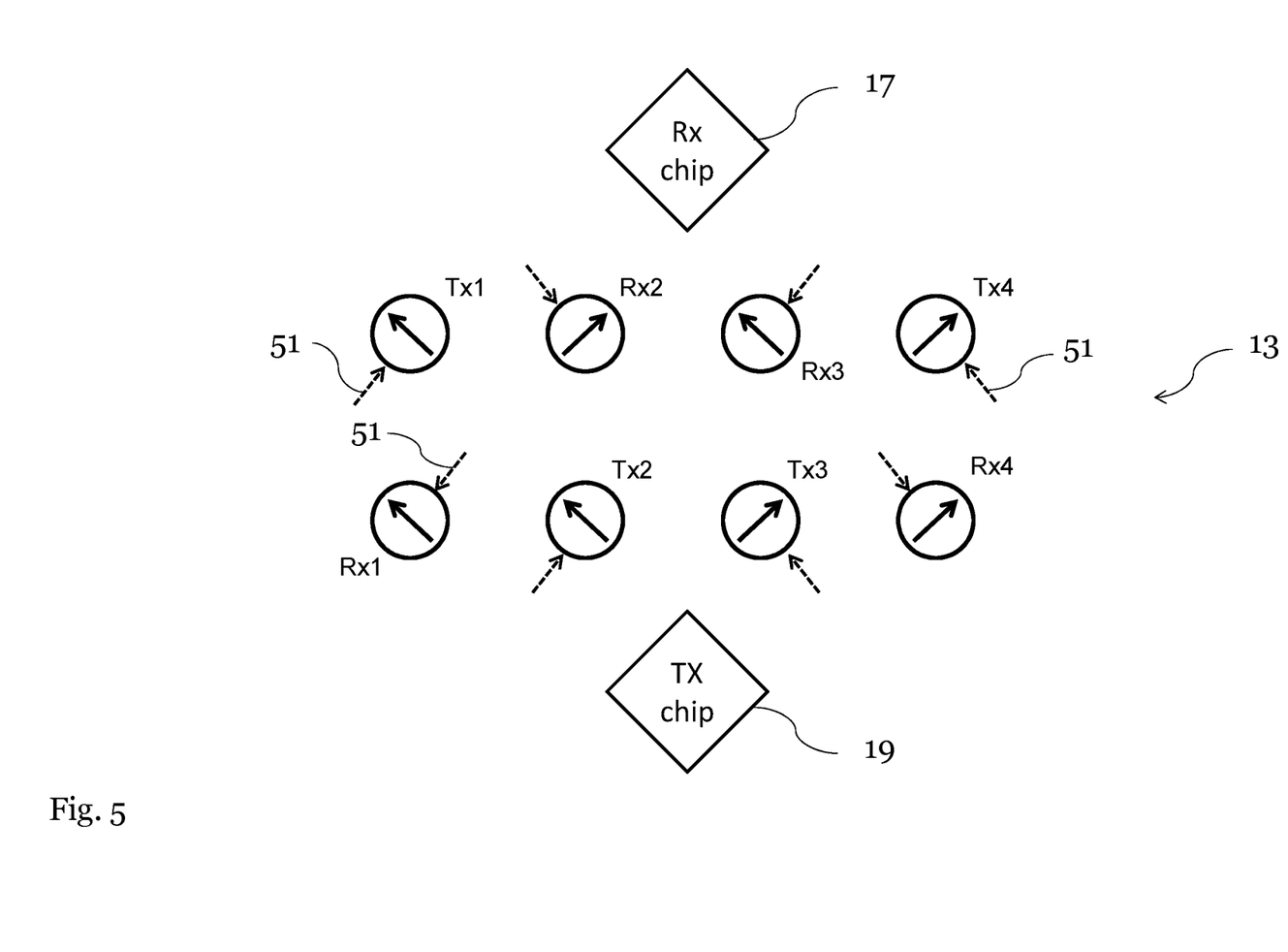
FIG. 5 shows a schematic diagram of an antenna array according to an embodiment.

FIG. 5 shows a schematic diagram of the antenna array 13 of the system 10 in FIG. 1 according to an embodiment.

In the schematic depiction of the antenna array 13 in FIG. 5, additional feeding lines 51 of each antenna are shown.

Preferably, the RX switching device 17 (RX-chip) only connects one of its plurality of input ports to its one output port at the same time, while the TX switching device 19 (TX-chip) only connects one of its plurality of output ports to its one input port at the same time.

Therefore, it is possible to toggle through the width of the antenna array by selecting the respective RX and TX antennas one after another, thereby generating a target for the radar of the DUT that moves from one side to the other side, for example from left to right or from right to left.

The RX switching device 17 and the TX switching device 19 can be arranged on different layers of a multilayer substrate, e.g. of a printed circuit board (PCB). This allows to connect a mix of closely spaced RX and TX antennas of various polarizations with the respective switching device. FIG. 5, for instance, shows a possible configuration, where the RX and TX switching devices 17, 19 are decoupled in terms of the substrate layer.

The setup shown in FIG. 5 can cover all possible test cases: both polarizations, elevation and azimuth test with vertically and horizontally aligned antennas and low, medium or high coupling between the TX and RX antennas.

Figure 6:
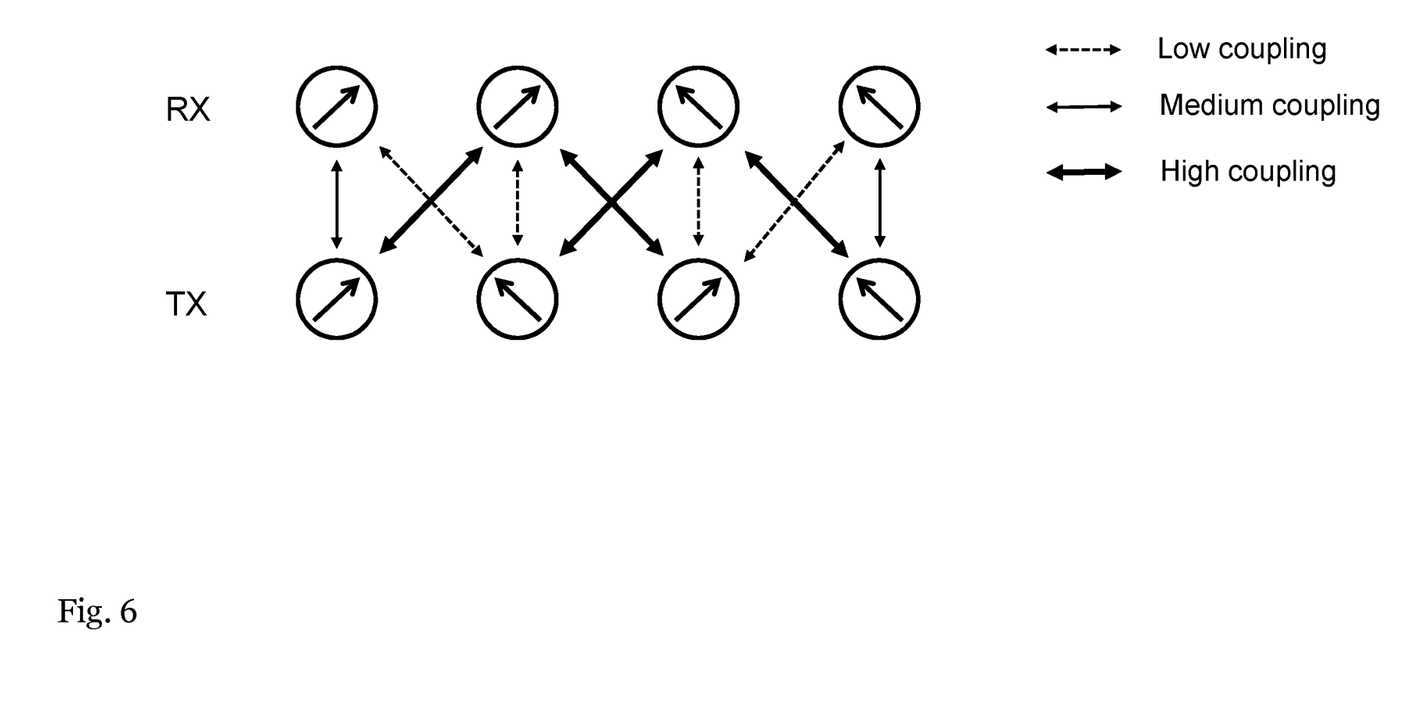
FIG. 6 shows a schematic diagram of an antenna array according to an embodiment.

FIG. 6 shows a schematic diagram of an antenna array according to an embodiment.

The antenna array of FIG. 6 comprises two rows of four antennas each. Thereby, all antennas of the top row are connected to the RX switching device 17 and are, thus, RX antennas, and all antennas of the bottom row are connected to the TX switching device 19 and are, thus, TX antennas.

The antenna array as shown in FIG. 6 can for instance be used for azimuth tests (i.e., no horizontally aligned RX and TX antennas).

In FIG. 6, the coupling between the different RX and TX antennas is highlighted. Each antenna has a polarization of either −45° or +45° (highlight by an arrow pointing to the upper left or upper right). Furthermore, the coupling between the different antennas is highlighted via arrows with different thickness between the various RX/TX antenna pairs. The coupling is weakest between RX/TX pairs with different antenna polarization.

Figure 7:
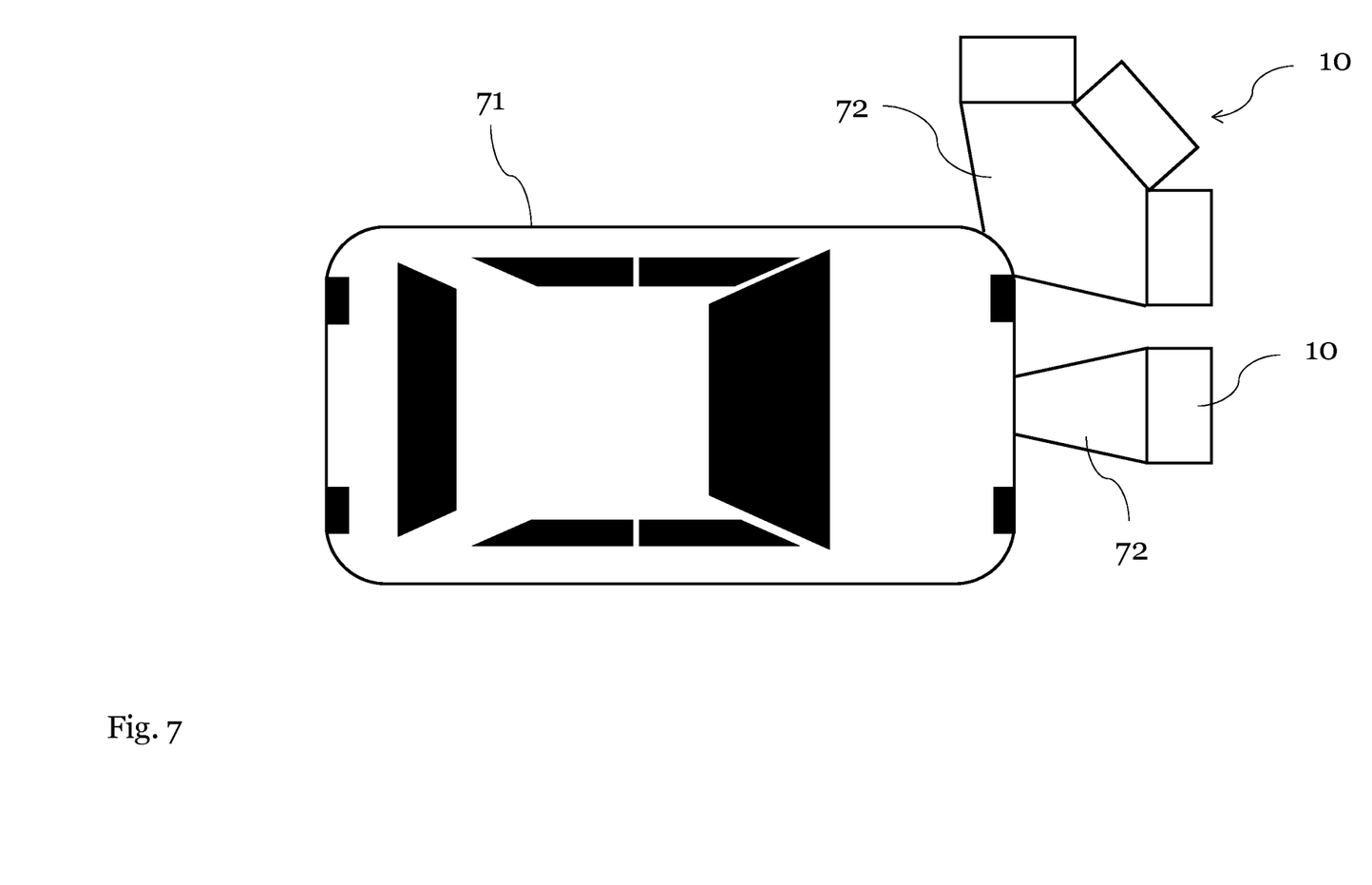
FIG. 7 shows a schematic diagram of an arrangement of radar test systems relative to a DUT according to an embodiment.

FIG. 7 shows a schematic diagram of an arrangement of radar test systems 10 relative to a DUT 71 according to an embodiment.

The DUT 71 in FIG. 7 is a vehicle which is equipped with at least two radar units, e.g. automotive radar sensors. For instance, one radar unit is arranged in a front center and one radar unit is arranged in a front side position of the vehicle. Of course, the vehicle could also only comprise one radar unit on the one hand and a plurality of radar units (for example at least 6, 7 or at least 8 or more than 8) on the other hand. More radar units are especially used by vehicles with level 3 to 5 autonomous driving.

Radar test systems 10 can be arranged in a certain distance to these radar units, in the direction of radar pulses that are emitted by the units. Absorbers 72 can further be arranged around the space between the radar unit and the radar test system 10, thereby forming a space for the transmitted and the reflected radar pulses.

Such automotive radar units may utilize different forms of antenna polarizations which are covered by test systems 10.

Usually, linearly polarized antennas are utilized in the radar units, mostly horizontally or vertically polarized ones. Other less common forms are +45° or −45° and left-handed or right-handed circular antenna polarizations.

In order to address all polarization manifolds, the test system 10 is equipped with at least two orthogonal antenna polarizations, e.g. horizontal and vertical linear polarization. In particular, the antenna arrangement of the test system 10 may cover all possible polarization sets as well as horizontal and vertical alignment in order to perform accurate angular tests in both directions. Thus, independently of the antenna polarization of the radar sensor under test, all test cases can be addressed by a single radar test system 10 frontend.

Furthermore, if all antennas of the test system 10 were horizontally aligned, only elevation tests could run without angular error. The same statement is valid for vertical alignment of the test system's antenna array 13. By providing RX and TX antennas with different polarizations, respective antenna pairs that are optimal for different can be selected.

In general, azimuth test requires to have antenna arrays arranged in azimuth direction. However, Rx and Tx antennas have to be aligned vertically (in elevation direction) in order to suppress errors in MIMO sensors.

Contrary to that, elevation test requires to have antenna arrays arranged in elevation direction. However, Rx and Tx antennas have to be aligned horizontally (in azimuth direction) in order to suppress errors in MIMO sensors.

The error topic is only valid for MIMO radar sensors. For MISO (multiple-input-single-output) or SIMO (single-input-multiple-output), the error topic is not relevant at all.

Instead of a car, as shown in FIG. 7, the vehicle can also be a motorbike, a truck or a bus.

Figure 8:
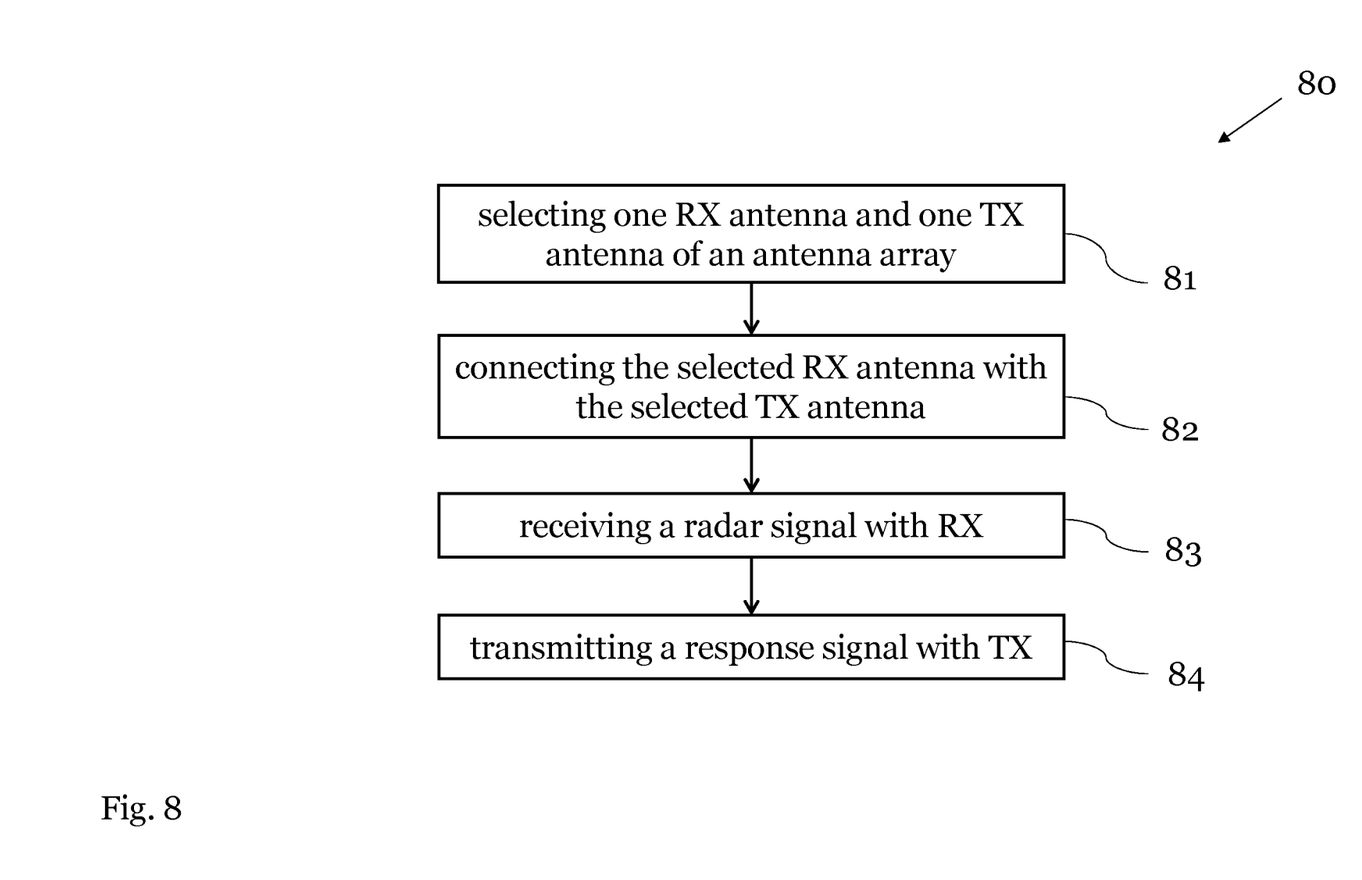
FIG. 8 shows a flow diagram of a method for testing a DUT according to an embodiment.

FIG. 8 shows a flow diagram of a method 80 for testing a DUT according to an embodiment.

The method 80 is carried out by using an antenna array, in particular the antenna array 13 in FIGS. 1 and 5, which comprises at least two RX antennas having a different antenna polarization and at least one TX antenna, or at least two TX antennas having a different antenna polarization and at least one RX antenna. The method 80 comprises the steps of:

selecting 81 one RX antenna and one TX antenna of the antenna array;

connecting 82 the selected RX antenna with the selected TX antenna;

receiving 83 a radar signal from the DUT with the selected RX antenna; and transmitting 84 a response signal to the DUT with the selected TX antenna.

The method 80 can be carried out with an antenna test system 10 as shown in FIG. 1. In particular, the steps of selecting 81 the RX and TX antennas and connecting the selected antennas can be carried out by the selection module 15. The method could be repeated until all antennas have been used once or until the respective tests (first, second and/or third operating mode) have been performed with the respective antennas needed therefore.

All features described above or features shown in the figures can be combined with each other in any advantageous manner within the scope of the invention.

The invention claimed is:

1. A radar test system for testing a device-under-test, DUT, comprising:
   an antenna array comprising:
     at least two RX antennas having a different antenna polarization and at least one TX antenna, or
     at least two TX antennas having a different antenna polarization and at least one RX antenna;
   a selection module configured to select one RX antenna and one TX antenna of the antenna array and to connect the selected RX antenna with the selected TX antenna, wherein the selected RX antenna and the selected TX antenna are adjacent RX and TX antennas of the antenna array;
   wherein the selected RX antenna is configured to receive a radar signal from the DUT; and
   wherein the selected TX antenna is configured to transmit a response signal to the DUT.

2. The radar test system of claim 1, wherein the antenna array comprises the same number of RX and TX antennas.

3. The radar test system of claim 1, wherein the antenna array comprises at least 2, 4, 8, 16, 24, 32, 48, 64, or 96 RX antennas, and/or at least 2, 4, 8, 16, 24, 32, 48, 64, or 96 TX antennas.

4. The radar test system of claim 1, wherein the selected RX antenna and the selected TX antenna are adjacent antennas of the antenna array.

5. The radar test system of claim 1, wherein the antennas of the antenna array are arranged in a grid comprising at least two vertically displaced rows;
   wherein, in a first operating mode of the selection module, the selected RX antenna and the selected TX antenna have a different antenna polarization and are arranged in the same row of the antenna array.

6. The radar test system of claim 1, wherein the antennas of the antenna array are arranged in a grid comprising at least two vertically displaced rows;
   wherein, in a second operating mode of the selection module, the selected RX antenna and the selected TX antenna have a different antenna polarization and are arranged in different rows of the antenna array but in the same column.

7. The radar test system of claim 1, wherein the antennas of the antenna array are arranged in a grid comprising at least two vertically displaced rows and at least two horizontally displaced columns;
   wherein, in a third operating mode of the selection module, the selected RX antenna and the selected TX antenna have an identical antenna polarization and are arranged in:
   a) the same row or in the same column of the antenna array; or
   b) different rows and different columns.

8. The radar test system of claim 1, wherein the selection module is configured to deselect the selected RX and the selected TX antenna after the transmission of the response signal, and to subsequently select and connect at least one additional pair of RX and TX antennas of the antenna array one after another.

9. The radar test system of claim 1, wherein the selection module comprises at least one RX switching device and at least one TX switching device;
   wherein some or all of the RX antennas are connected to a respective input port of the RX switching device, and wherein some or all of the TX antennas are connected to a respective output port of the TX switching device;
   wherein the selection module is configured to connect one of the input ports of the RX switching device to one of the output ports of the TX switching device.

10. The radar test system of claim 1, wherein the selection module is configured to downconvert the received radar signal into an intermediate frequency, IF, signal, to upconvert the IF signal to form the response signal, and to forward the response signal to the selected TX antenna for transmission to the DUT.

11. The radar test system of claim 10, wherein the selection module comprises a local oscillator for a down-conversion of the received radar signal to the IF signal, and for an up-conversion of the IF signal to the response signal.

12. The radar test system of claim 1, wherein the selection module further comprises a delay unit configured to delay the transmission of signals from the selected RX antenna to the selected TX antenna.

13. The radar test system of claim 1, wherein the selection module comprises at least one power detector which is arranged between the selected RX and TX antennas connected to each other;
   wherein the power detector is configured to detect a signal strength of a signal received by the selected RX antenna and to classify said signal based on the signal strength.

14. The radar test system of claim 13, wherein the power detector is configured to classify a signal received at the selected RX antenna as a crosstalk signal if the signal strength is below a threshold value;
   wherein the selection module is configured to reduce an amplification and/or to increases an attenuation of a received signal that is classified as cross-talk signal.

15. A set comprising the radar test system according to claim 1 and a DUT, wherein the DUT comprises at least one radar unit;
   wherein the radar test system is arranged in the direction of a radar pulse emitted by the at least one radar unit.

16. A method for testing a device-under-test, DUT, using an antenna array,
wherein the antenna array comprises:
at least two RX antennas having a different antenna polarization and at least one TX antenna, or
at least two TX antennas having a different antenna polarization and at least one RX antenna;
wherein the method comprises the steps of:
selecting one RX antenna and one TX antenna of the antenna array, wherein the selected RX antenna and the selected TX antenna are adjacent RX and TX antennas of the antenna array;
connecting the selected RX antenna with the selected TX antenna;
receiving a radar signal from the DUT with the selected RX antenna; and
transmitting a response signal to the DUT with the selected TX antenna.

* * * * *